Figure 1:
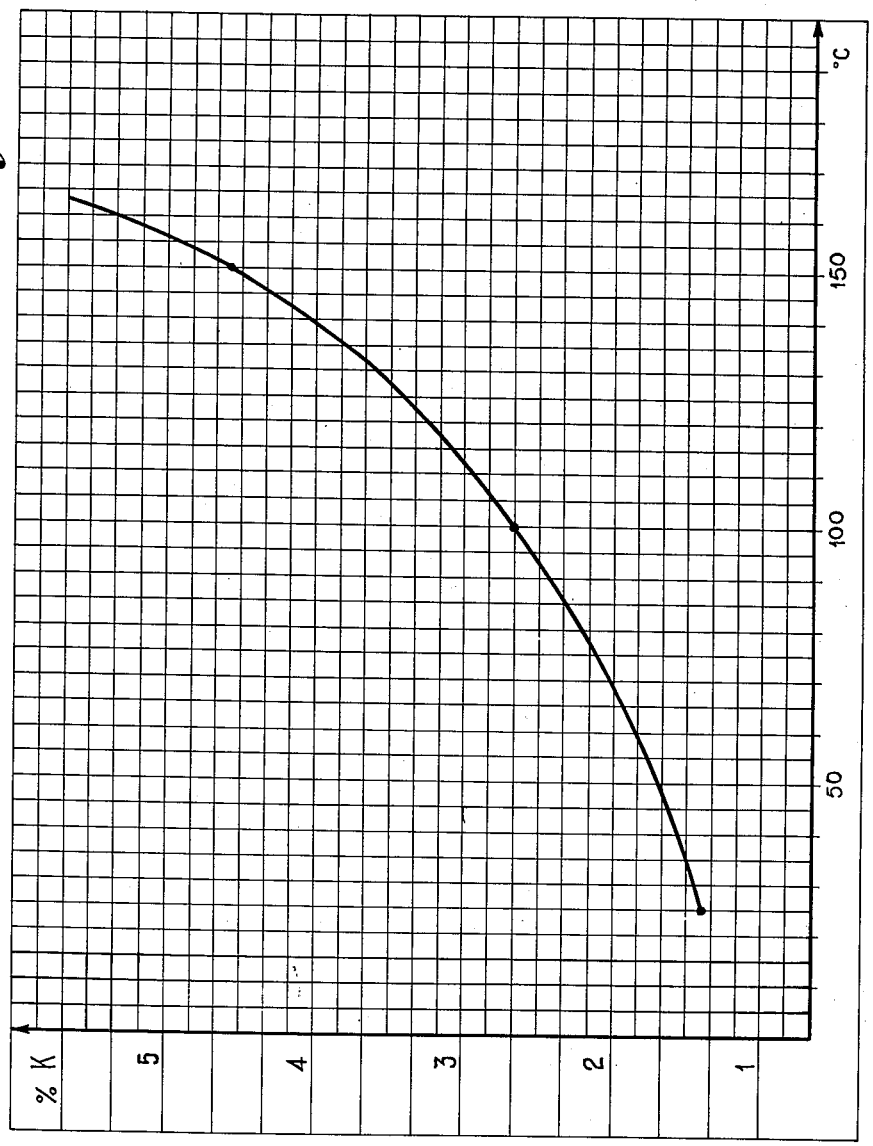

Dec. 27, 1960

S. CARBOTTI 2,966,395

PROCESS FOR RECOVERING POTASSIUM
FROM SOLUTIONS THEREOF

Filed Nov. 1, 1957

3 Sheets-Sheet 1

INVENTOR
SERGIO CARBOTTI
by Walter S. Aleston
ATTORNEY

United States Patent Office 2,966,395
Patented Dec. 27, 1960

2,966,395

PROCESS FOR RECOVERING POTASSIUM FROM SOLUTIONS THEREOF

Sergio Carbotti, Rome, Italy, assignor to Soc. Sali Potassici Trinacria, Palermo, Italy Filed Nov. 1, 1957, Ser. No. 694,040

Claims priority, application Italy June 3, 1957

3 Claims. (Cl. 23—121)

The present invention gives an account of a process for recovering potassium from any solution containing it, as for example solutions obtained from the working of potassium minerals, as hartsaltz, lankbeinite, sylvinite, carnallite, by means of lead sulphate, and it furthermore gives an account of the application of such a process for obtaining potassium sulphate from crude kainite only.

A working cycle for the production of potassium sulphate starting from kainite mineral $$(KCl.MgSO_4.3H_2O+NaCl)$$

is already known.

Such a cycle consists of the following steps:

(1) The dissolving of a certain amount of schoenite $(K_2SO_4.MgSO_4.6H_2O)$ in hot aqueous potassium sulphate $(K_2SO_4)$ solution.

The quantitative ratio between schenite and potassium sulphate solution was chosen in such a way to obtain, by cooling at room temperature, a crystallization of potassium sulphate of a high degree of purity (48–50% of $K_2O$).

(2) Treatment of a certain amount of kainite mineral with the mother-liquors obtained in the previous step after separation of the potassium sulphate precipitated, so as completely to transform this kainite into schoenite, which was again employed in the cycle, and to dissolve almost the whole of sodium chloride which is contained in the kainite as impurity.

(3) Reaction of the mother-liquors obtained in the previous operation, after separation of the schoenite precipitated, with gypsum $(CaSO_4.2H_2O)$ at room temperature, in order to obtain a double potassium and calcium sulphate, or calcium syngenite $(K_2SO_4.CaSO_4.H_2O)$ which is insoluble and could therefore be separated from the solution, which was discarded.

(4) Decomposition of the calcium syngenite, coming from the previous treatment, by means of hot water.

In this way was obtained a solution of potassium sulphate which was used for the reaction 1, and gypsum which was sent back to reaction 3.

By means of this cycle, it was thus possible to obtain potassium sulphate with a high $K_2O$ content by using crude kainite only; the total K yield, obtained in such a manner, was about 60%.

This familiar cycle, which has the advantage of yielding a production of potassium sulphate by using crude kainite alone and does not require extra operations, such as the flotation for the separation of the rock salt, nevertheless presents two inconveniences which limits its utilization. They are:

(1) The formation reaction of calcium syngenite needs a very long time (72 hours) for its accomplishment.

(2) The total K yields of the whole cycle is still low.

One of the purposes of the present invention is to provide a process which allows us to obtain potassium sulphate from crude kainite alone, eliminating these inconveniences.

Figure 2:
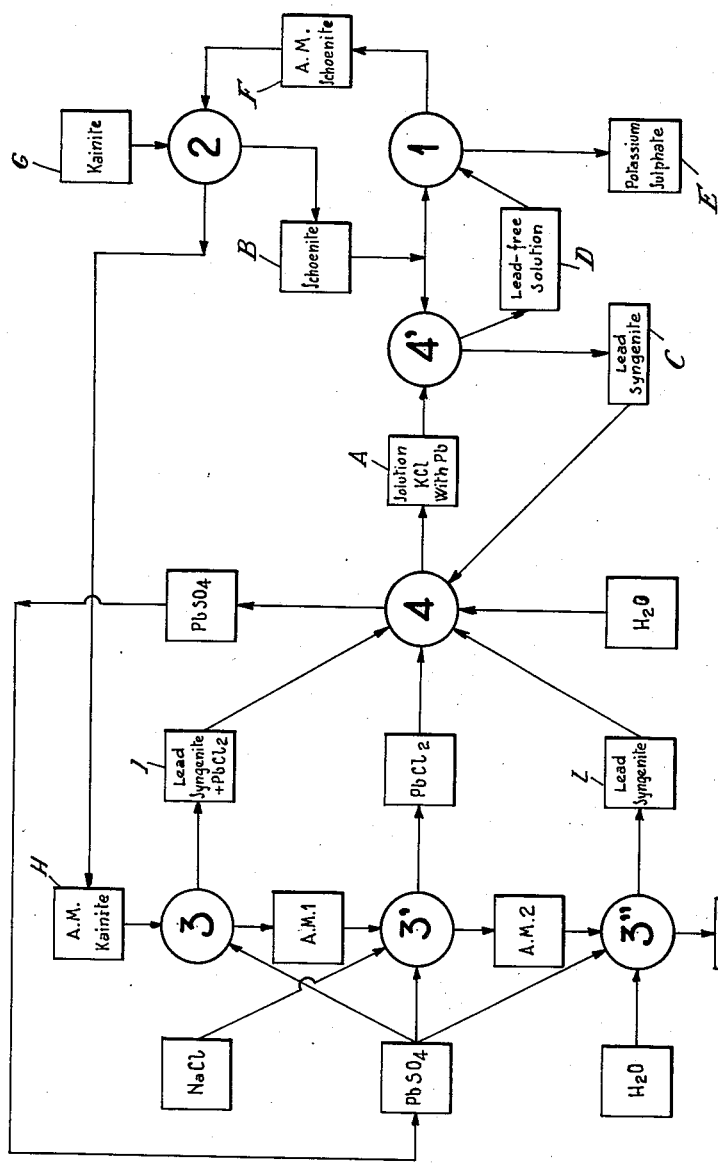

The invention will be described in detail later with reference to the drawings enclosed, wherein:

Fig. 1 shows a diagram on a Cartesian axis, where the percentage variations of K are plotted as a function of reaction temperatures;

Fig. 2 schematically shows a working cycle according to the invention; and

Figure 3:
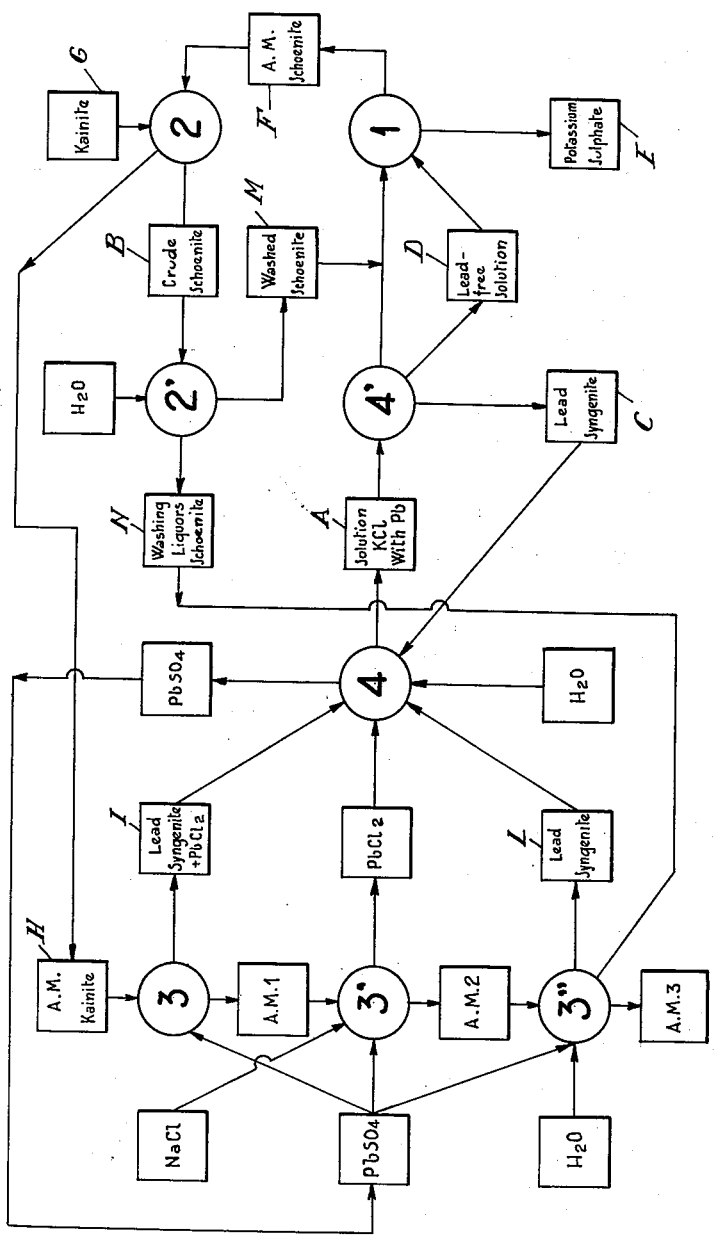

Fig. 3 schematically shows a working cycle slightly modified from that explained in Fig. 2.

Before describing in detail the working cycles shown in Figs. 2 and 3, it seems opportune to mention briefly the difficulties encountered and the attempts made to arrive at the results which form the subject of the present application.

The product which is formed in the reaction between potassium sulphate and lead sulphate and which, by analogy with calcium syngenite, we shall call "lead syngenite," has the formula: $K_2SO_4.PbSO_4$.

The tests made by allowing lead sulphate to react with solutions containing potassium, of different compositions, soon proved to be extremely interesting because of the high speed of formation of the lead syngenite, as well as for the low content of residual potassium of the solutions after reaction.

In fact, after only 3 hours of reaction time, the residual potassium content, even in the most unfavourable run, reached values over the range of 0.7–0.9%. These are low values in comparison with those of the residual solution from calcium syngenite which, after 72 hours of reaction, still were in the range of 2%.

These results suggested that we had overcome the difficulties of the cycle with calcium syngenite by the simple substitution of gypsum by lead sulphate, leaving the remainder of he working cycle unchanged.

Two difficulies encounered during these experiments however render this simple solution of the problem impossible, and another working cycle must be studied.

The difficulties encountered were the following:

(1) In the experiments on the formation of lead syngenite by reaction between a solution containing potassium, and lead sulphate, a difference in the behaviour was noted, if the solution employed contained chlorine or not.

While in the experiments with a solution of pure potassium sulphate, there simply resulted a reduction of potassium and $SO_4$ content of the solution, corresponding to the formation of lead syngenite, in the solutions which also contained chlorine, as those coming from the transformation of crude kainite in schoenite, a simultaneous reduction of the chlorine and an increase of the $SO_4$ content took place as well as a reduction of the potassium content, what could not be explained solely by the hypothesis of the formation of lead syngenite.

(2) In the working cycle briefly described above, the potassium separated from the solution in the form of calcium syngenite was recovered by decomposing the latter with water at 100°, so as to obtain a potassium sulphate solution which was sent back into the cycle.

When the applicant for the patent tried to use same method for the decomposition of lead syngenite, he found that for this decomposition an amount of water was necessary which was much larger than that required to close the cycle.

This depended on the lower potassium concentration of the solutions in equilibrium with a solid phase consisting of lead syngenite+lead sulphate, in comparison with that of the solutions in equilibrium with a solid phase consisting of calcium syngenite+gypsum; this is clear from Table I, which was obtained from the literature values, and indicates the percentages of $K_2SO_4$ in solutions in equilibrium with a solid phase consisting of calcium syngenite+gypsum and of lead syngenite+ lead sulphate, as a function of the temperature.

Table I

| Temperature, ° C. | Calcium syngenite + gypsum, percent K$_2$SO$_4$ | Lead syngenite + lead sulphate, percent K$_4$SO$_4$ |
| --- | --- | --- |
| 18 | 2.79 | 0.62 |
| 50 | 4.10 | 1.09 |
| 75 | 4.85 | 1.37 |
| 100 | 5.37 | 1.69 |

Thus, in order to recover all the potassium, which is separated with the lead syngenite, it was necessary to use a much larger amount of water than was necessary for the cycle, and therefore the solution obtained has to be concentrated by evaporation.

First approximation calculations showed that this would lead to a too expensive process for the big amounts of solutions in use.

The diminution of the chlorine content and the simultaneous increase of the SO$_4$ content of the solutions, which could not be ascribed to the reaction of the formation of lead syngenite, could be explained only by admitting that the following reaction also takes place, simultaneously with that reaction:

$$PbSO_4 + 2Cl^- \rightleftharpoons PbCl_2 + SO_4^{--}$$

This means that there is obtained lead chloride, which is itself a sparingly soluble compound, under the experimental conditions of lead syngenite formation, and that therefore it precipitates withdrawing chlorine from the solution, while at the same time SO$_4$ goes into solution in an amount corresponding to the PbCl$_2$ formed.

This reaction is known in the literature and was checked by the applicant, who let the reaction take place between a solution of pure sodium chloride, instead of a solution containing potassium, and lead sulphate, under the same experimental conditions.

In this case the only possible reaction is the following:

$$PbSO_4 + 2NaCl \rightleftharpoons PbCl_2 + Na_2SO_4$$

The results obtained are collected in Table II.

Table II

| | Analysis of the solution before the reaction with PbSO$_4$ | Analysis of the solution after the reaction with PbSO$_4$ |
| --- | --- | --- |
| Cl, percent | 14.586 | 12.376 |
| SO$_4$, percent | 0.000 | 2.928 |

Reverting to a consideration of the experiments with the solutions containing potassium, there is, beside the formation of lead syngenite, a simultaneous formation of PbCl$_2$ and one has therefore, after the reaction, a solid phase consisting of lead syngenite, PbCl$_2$ and eventually unreacted PbSO$_4$.

Furthermore, the solution in this case has a rather high content of lead (about 0.3%), while, in the case of reactions with chlorine-free solutions, this content is practically negligible.

Calculations show that the cost due to the lead lost in this way, is higher than the cost of the potassium recovered by means of lead syngenite, even neglecting that it is necessary to recover lead sulphate from the precipitated lead chloride; it is therefore impossible to adapt the recovery process by means of lead syngenite to chlorine-containing solutions, unless that the formation of lead chloride is prevented and the lead content of the residual solution after the reaction is diminished.

Considering again the reaction of formation of PbCl$_2$ described above, the equation of its equilibrium constant is the following:

$$K = \frac{[PbCl_2][SO_4^{--}]}{[PbSO_4][Cl^-]^2}$$

If one assumes a constant temperature and the presence of a solid phase containing PbSO$_4$ and PbCl$_2$, one can to a first approximation consider, for the following reasoning, that the concentrations of PbSO$_4$ and of PbCl$_2$ in the solution are constant although the total concentration of the solution varies, and can be summarized in terms of only one constant K'.

The equation therefore assumes the form:

$$K' = \frac{[SO_4^{--}]}{[Cl^-]^2}$$

If one considers this equation, it is shown that, taking a solution containing potassium and chlorine, after the reaction with PbSO$_4$, and in equilibrium in the presence of a solid phase consisting of lead syngenite, PbCl$_2$ and PbSO$_4$, and diluting it with water so as to reduce, for example, the SO$_4$ and Cl concentrations to one half of the initial value, the [SO$_4^{--}$]/[Cl$^-$]$^2$ ratio will not remain constant, but will become the double of its initial value.

This means that, as K' remains unchanged, the value of the concentration of Cl$^-$ must increase and that of SO$_4$ must decrease until the ratio [SO$_4^{--}$]/[Cl$^-$]$^2$ assumes again the value K'.

In order that this may happen, it is necessary that the reaction:

$$PbSO_4 + 2Cl^- \rightleftharpoons PbCl_2 + SO_4^{--}$$

shifts from the right to the left, that is the PbCl$_2$, which is present as solid phase, is transformed into PbSO$_4$.

Arbitrarily changing the dilution one should be able completely to transform all the PbCl$_2$ formed from the concentrated solution again into PbSO$_4$; in other words, by suitable dilution of the concentrated solution, before letting it react with the lead sulphate, it should be possible to avoid the formation of PbCl$_2$.

Experiments made showed the correctness of this reasoning; in fact, it was found that as the dilution increases, the formation of lead chloride decreases until at a given dilution it disappears completely.

In these experiments it was also seen that the percentage of lead and potassium of the solutions obtained diminished as the dilution increased up to a constant value of about 0.025% for the lead and 0.2% for the potassium. In this way it is possible, by suitable dilution of the solutions, to avoid the formation of lead chloride and reduce the loss of lead in the final solution to an economically convenient value.

In order to overcome the other difficulty, namely, that arising from the impossibility to recover economically the potassium contained in the lead syngenite by decomposition with water, let us consider the reactions which take place when a solution of potassium chloride is allowed to react with the lead sulphate.

The potassium chloride reacts with the lead sulphate according to the equation:

$$PbSO_4 + 2KCl \rightleftharpoons K_2SO_4 + PbCl_2$$

The potassium sulphate formed will then react, in turn, with the lead sulphate according the reaction:

$$PbSO_4 + K_2SO_4 \rightleftharpoons K_2SO_4 \cdot PbSO_4$$

By addition of these two reactions, we finally obtain:

$$2PbSO_4 + 2KCl \rightleftharpoons K_2SO_4 \cdot PbSO_4 + PbCl_2$$

On applying this reaction one should obtain, by reaction between lead chloride and lead syngenite, a solution of potassium chloride.

The concentration of this solution naturally depends on the values of the chemical equilibrium established and, as the solubility of lead chloride increases with the temperature faster than that of PbSO₄, a temperature increase, other conditions being equal, should displace the reaction to the left and should therefore conduce to a solution with a higher concentration in K.

The experiments made confirmed these hypotheses; in the Table III are given K percentages of solution obtained by the reaction, in the presence of water, between $PbCl_2$ and lead syngenite, in stoichiometric amounts, at different temperatures.

Table III

| Temp., °C | 25 | 100 | 150 |
|---|---|---|---|
| K, percent | 1.43 | 2.68 | 4.56 |

With these values the diagram of Figure 1 was constructed which gives the variation of the K concentration of the solution obtained by the reaction between lead syngenite and $PbCl_2$ as a function of the reaction temperature.

The solutions obtained always contain, moreover, a certain percentage of Pb, which is higher, the higher the temperature, and on the contrary only a trace of $SO_4$.

In this way one is able to recover the K contained in the lead syngenite, in the form of a solution of KCl, and therefore a complete cycle of working of the kainite can be realized.

Nevertheless, before proceeding with the description of this cycle, we wish to mention two other results which can be reached with the same cycle and these are:

(1) The production of a lead-free potassium sulphate; and (2) The production in an economical way of the necessary amount of lead chloride for the decomposition of the lead syngenite.

We previously saw that from the decomposition of the lead syngenite a lead-containing solution of KCl is obtained.

As will be seen from the cycle which will be described, this solution of KCl will be allowed to react with the schoenite in order to obtain potassium sulphate.

If this reaction were allowed to proceed directly with a lead-containing solution of KCl, this lead would be found in the form of lead syngenite in the potassium sulphate obtained.

This must be avoided, in order not to bring on the market a product containing lead salts, which could be damaging, as well as not to lose this amount of lead, which would considerably affect the cost of the working.

In order to obviate this inconvenience, the following device is used:

To the hot solution of KCl, coming from the decomposition of the syngenite is first added a part of the schoenite, so that it still remains soluble; in such a way the whole lead present in the solution will precipitate in the form of lead syngenite.

This lead syngenite is separated by filtration and brought again into the cycle so as to recover the Pb as well as the K completely; while the solution, now free from lead, is sent to the following process.

In the experiments made we were able to eliminate all the Pb, obtaining a solution which gave a negative reaction with potassium chromate.

We saw that the lead chloride is formed, together with the lead syngenite, when a solution containing K and Cl, at a certain concentration, is allowed to react with lead sulphate.

Moreover, as we will see later, the amount of $PbCl_2$, usually obtained, is enough for the decomposition of the lead syngenite. Nevertheless, it is possible that in some cases, one is not able to obtain all the amount of $PbCl_2$ necessary to close the cycle in this way and one is so obliged to prepare some of it in a different way.

We have therefore studied the possibility of producing lead chloride by another economical method; i.e.: (1) by the reaction of a solution of NaCl with $PbSO_4$; and (2) by the reaction of the mother-liquors of the transformation kainite-schoenite, enriched with chlorine by addition of NaCl, and $PbSO_4$.

We have already reported above that lead chloride is obtained by the reaction between a NaCl solution and lead sulphate; this reaction may then be used for the production of a part of the necessary $PbCl_2$.

The second way consists of obtaining all the necessary $PbCl_2$ from the mother-liquors of the transformation kainite-schoenite, by enriching them with chlorine by means of NaCl.

Suppose these mother-liquors were to react with $PbSO_4$ and to yield not all the necessary $PBCl_2$; the solution obtained would be impoverished in Cl, as we saw, because of the formation of $PbCl_2$.

If now one adds NaCl, in the form of a solid or of a concentrated solution, to this solution, its chlorine content will increase, and therefore it will be able to form, by further reaction with $PbSO_4$, a further amount of $PBCl_2$.

Experiments showed that in this way it is actually possible to produce a further amount of $PbCl_2$, either by addition of solid NaCl, or by addition of a concentrated solution of NaCl.

Before describing the working cycle of the crude kainite grounded on the recovery of the potassium from the mother-liquors of the transformation kainite-schoenite through the formation of lead syngenite, we wish to point out here that this potassium recovery studied and worked over during research experiments on the kainite, can be more generally applied in solutions containing potassium, of anyone source.

We will here briefly review, how the results obtained until now can be applied to the recovery of the potassium from other solutions containing it, as for example those obtained in the working of sylvinite, carnallite, hartsalz and langbeinite.

Supposing a solution containing potassium in larger amount than that corresponding to the values of equilibrium with the lead syngenite, three cases can arise:

(1) The solution contains, in addition to the potassium, $SO_4$ but not Cl.

(2) The solution contains, in addition to the potassium, Cl but no $SO_4$.

(3) The solution contains, in addition to the potassium, $SO_4$ as well as Cl.

We will now consider how the recovery of the potassium by means of lead syngenite, can be applied to each of the three cases.

In the first case, by addition of lead sulphate to the solution, only lead syngenite will be formed and no lead chloride. In order to obtain the necessary amount of lead chloride, we must add sodium chloride to this solution; this addition can be made, depending on the composition of the solution, either directly on the solution before letting it react with lead sulphate, or on the mother-liquors obtained after separation of the lead syngenite formed.

The remaining solution, after the formation of lead syngenite+lead chloride, will be then diluted and again treated with lead sulphate, as it will be described in detail.

In the second case, by addition of lead sulphate to the solution, lead syngenite as well as lead chloride will be formed.

However, it may be happen, if the initial concentration of Cl is too high, that too much lead chloride will be formed in respect to the amount necessary for the decomposition of the lead syngenite.

In this case we must modify the composition of the solution before letting it react with the lead sulphate, by addition of $SO_4$ ions, in such a way to limit the formation of lead chloride to the necessary amount.

This variation can be made either by adding products containing $SO_4$, or by adding solutions containing $SO_4$ and coming from other steps of the same process or from other processes, if they are available.

For example, this addition can be made by putting in the solution solid kieserite or its aqueous solution.

The solution in this way modified, will be allowed to react with lead sulphate and after separation of the lead syngenite and the lead chloride formed, it will be properly diluted and let react again with lead sulphate in the usual way.

In the third case, one may have a solution of such a composition, that, by addition of lead sulphate to the solution, the amount of lead chloride will be formed exactly necessary for the decomposition of the lead syngenite; it will therefore be enough to add lead sulphate to this solution and, after separation of the lead syngenite and the lead chloride, to dilute it properly and let it react again with lead sulphate in the usual way.

However, we may have a solution which contains too little or too much Cl; in the first occurrence, we go back to the case considered as first and we must therefore add sodium chloride to the solution; in the second occurrence we go back to the case considered as second, and we must therefore add $SO_4$ ions. The treatment will then be the same as that described in these two previous cases.

After this review of the difficulties encountered before arriving at the process of the present invention, two working cycles of the kainite, representing two practical realizations of the invention itself, are now described in detail, with reference to the Figs. 2 and 3.

The working cycle shown in Fig. 2 consists of the following steps:

(a) A solution A of KCl, containing Pb, the preparation of which will be described later, is treated in 4', at a temperature of about 100° C., with a given amount of schoenite, which we shall schematically indicate by B.

The quantitative ratio between the solution of KCl and the schoenite is chosen in such a way that the latter goes completely into solution.

In this way all the Pb present in the solution of KCl precipitates in the form of lead syngenite, which is separated, for example by filtration, from the hot solution, as is schematically indicated by C.

The lead syngenite, so obtained, is collected together, with the other syngenite formed during the working and sent back into the cycle.

(b) The hot solution D, obtained in the previous step, is treated in 1 with further schoenite coming from B, in such an amount that, by cooling the solution obtained at room temperature, a crystallization of potassium sulphate of a high degree of purity (48–50% of $K_2O$) takes place, as is schematically shown in E.

(c) The mother-liquors of the schoenite, obtained from the previous step, after the separation of the precipitated potassium sulphate, named A.M. schoenite and schematically indicated by F, are used to treat, in 2, crude kainite, containing rock salt, indicated by G.

In this step the kainite is kept stirred in the A.M. schoenite for a time sufficient to allow the complete transformation of the kainite in schoenite, as is shown in B. The ratio between the amounts of the A.M. schoenite and of the kainite, and the composition of the kainite used, are so chosen, that on one side, the same amount of schoenite previously employed for the transformation in potassium sulphate E is obtained and, on the other side, the sodium chloride contained in the crude kainite, dissolve almost completely in the A.M. schoenite, so as to yield a schoenite which contains only small amounts of it.

The schoenite obtained in this treatment is introduced into the cycle at the steps 4' and 1, now to be described, while the mother-liquors, separated from the solid are conveyed to the next step.

(d) These mother-liquors, named A.M. kainite and schematically indicated by H, are allowed to react in 3 with lead sulphate at room temperature, in order to form a solid I consisting of lead syngenite ($K_2SO_4.PbSO_4$) +$PbCl_2$, which can be separated from the solution remaining after the reaction.

(e) The solution coming from the previous step, named "mother-liquor from the first treatment" and schematically indicated by A.M. 1, after separation of the solid, is again treated in 3', at room temperature, with lead sulphate in the presence of solid NaCl, in order to obtain further $PbCl_2$.

The NaCl added is in such an amount as to yield in this step the necessary amount of $PbCl_2$ to close the cycle and which was not obtained in the previous treatment.

The necessary amount of NaCl can be added either in form of a concentrated solution, or a solid. Of course, the last step (e) can eventually be left out, if in the previous step (d) the amount of $PbCl_2$ necessary to close the cycle was already obtained.

(f) The solution obtained from the previous step, after separation of the $PbCl_2$, is named "mother-liquor from the second treatment" and it is schematically indicated by A.M. 2; it is conveniently diluted with water and allowed to react in 3" with lead sulphate at room temperature.

By means of this operation a further amount of the K contained in the mother-liquor from the second treatment is recovered in L, in the form of lead syngenite, and it is reduced in the percentage of lead which is contained in the residual solution after the reaction and that must therefore be eliminated from the cycle. The solution obtained, after the separation of the lead syngenite, is named "discharge mother-liquor" and it is schematically indicated by A.M. 3; it is discarded, while the lead syngenite is sent to the decomposition.

(g) Finally all the lead syngenite, formed in the steps (a), (d) and (f); and the lead chloride formed in the steps (c) and (e) described above, are treated with hot water, as shown in 4, at such a temperature as to give rise to a lead-containing solution of KCl, as shown in the diagram in Fig. 1, equal to the solution A employed in the step 4', and thus to complete the cycle.

In this process lead sulphate is also obtained and is sent back to the cycle, after separation from the solution of KCl.

Referring to Fig. 3, we shall now describe another working cycle which differs from that of Fig. 2 substantially because, in this case, the schoenite, before being allowed to react with the solution of KCl in order to give potassium sulphate, is subjected to a washing process 2' with water.

This washing process was suggested by the consideration that in the formation reaction of the potassium sulphate, the yield in potassium sulphate is higher the lower the content of uncombined magnesium sulphate, in the schoenite employed.

As the schoenite B, which is obtained from 2 by the action of the A.M. schoenite on the kainite, always contains a certain amount of uncombined magnesium sulphate, by this washing process one achieves a more complete transformation of schoenite into potassium sulphate.

Moreover, in this washing 2, it is possible too to dissolve a certain amount of NaCl present as impurity in the schoenite. Therefore we will be able to put into the cycle a schoenite 3 with a higher NaCl content, which means a schoenite coming from a kainite with a lower $K_2O$ conent. Naturally in this washing a certain amount of K is also dissolved, and it will therefore be necessary to introduce into the cycle the washing-liquors N, in order to recover this K. For this purpose, they are used in the dilution of the mother-liquor from the second treatment; all the potassium contained in them will be in this way recovered in the form of lead syngenite and the loss of K of the whole cycle will depend only, as in the cycle of Fig. 2, on the K content of the discharged mother-liquor. This cycle thus consists of the same reactions as the cycle 1, and more precisely the steps schematically indicated by 4', 1, 2, 3 and 3' remain unchanged.

As in the cycle previously described, in the reaction 3, one could obtain all the lead chloride necessary for the cycle, and therefore it would not be necessary to subject the mother-liquor from the first treatment to the reaction 3' in order to obtain more $PbCl_2$.

It can be therefore sent in such a case directly to the reaction 3".

In comparison with the previous cycle, step 3" undergoes a modification consisting of diluting the mother-liquors not only with water, but with water and the solution N coming from the washing of the schoenite. In this case also, one will obtain discharged mother-liquors which are discarded and lead syngenite which is sent to the decomposition reaction 4. Moreover, in this cycle there is the step 2' of washing the schoenite, which did not exist in the cycle previously described. In this operation, the crude schoenite coming from step 2, is washed with water at room temperature; the washing-liquor N is then separated, for example by filtration, and sent, as already described, to the reaction 3", while the washed schoenite M is employed for the next transformation into potassium sulphate E.

In order to explain the invention more clearly, two particular examples will be now described, one for each cycle, which must simply illustrate the present process and not limit it any way.

*Example 1*

(4') The elimination of lead from the solution of KCl:

1000 g. of a KCl solution, containing lead, and having the following composition:

| | Percent by weight |
|---|---|
| K | 4.833 |
| Pb | 0.476 |
| Cl | 4.546 |
| $H_2O$ | 90.145 | are heated at 100° C.

To this hot solution, 100 g. of schoenite are added of the following composition:

| | Percent by weight |
|---|---|
| K | 16.600 |
| Mg | 5.679 |
| Na | 0.731 |
| $SO_4$ | 41.850 |
| Cl | 1.844 |
| $H_2O$ | 33.210 |
| Insoluble | 0.086 |

The schoenite dissolves completely, while lead syngenite forms, which precipitates. The solution is warmed for 5 minutes and then filtered in order to separate the precipitate; the test for the lead with potassium chromate is negative on this solution. The lead syngenite precipitated is sent to the decomposition reaction 4.

(1) Reaction of the KCl solution with schoenite:

Another 480 g. of schoenite, of the composition already described, is added to the hot solution coming from the previous reaction 4'. The solution is kept at a temperature of 100° C. for the time (about 5 minutes) necessary to dissolve completely the schoenite added and is then cooled quickly to room temperature (25° C.).

In such a way the potassium sulphate is precipitated; the mixture is allowed to stay for two hours at room temperature and the precipitate is then separated by filtration under vacuo.

179 g. of potassium sulphate are so obtained, with the following composition in a wet condition:

| | Percent by weight |
|---|---|
| K | 35.910 |
| Mg | 0.887 |
| Na | 0.308 |
| $SO_4$ | 47.450 |
| Cl | 0.594 |
| $H_2O$ | 14.589 |
| Insoluble | 0.262 |

The $K_2O$ content of the dry product will then be:

$$K_2O = \frac{35.910}{85.411} \times 1.2046 \times 100 = 50.645\%$$

(2) Reaction of the A.M. schoenite with kainite:

The A.M. schoenite, coming from reaction 1, is treated at room temperature with 630 g. of crude kainite, by mechanical stirring for 3 hours and is then allowed to stay for another 2 hours.

The kainite employed has the following composition:

| | Percent by weight |
|---|---|
| K | 11.271 |
| $K_2O$ | 13.577 |
| Mg | 7.103 |
| Na | 10,483 |
| $SO_4$ | 28.739 |
| Cl | 25.842 |
| $H_2O$ | 16.155 |
| Insoluble | 0.357 |

The schoenite precipitated is then separated from the A.M. kainite by filtration under vacuo. 590 g. of schoenite are so obtained having the following composition in a wet condition:

| | Percent by weight |
|---|---|
| K | 16.366 |
| Mg | 5.592 |
| Na | 1.035 |
| $SO_4$ | 41.290 |
| Cl | 2.264 |
| $H_2O$ | 33.007 |
| Insoluble | 0.446 |

This schoenite is sent again into the cycle in the previous steps 4' and 1.

(3) Reaction of the A.M. kainite with $PbSO_4$:

The A.M. kainite, coming from the previous step is allowed to react with $PbSO_4$, leaving it in contact with the latter, at room temperature, for 3 hours. After this time, the solid is separated from the liquid by filtration under vacuo. The solid obtained contains 45.30 g. of K in the form of lead syngenite ($K_2SO_4 \cdot PbSO_4$) and 46.20 g. of Cl in the form of $PbCl_2$.

It appears from this value that the $PbCl_2$ obtained in this reaction is sufficient, as already said, to transform into KCl all the potassium separated in the cycle in the form of lead syngenite; in fact, the solution of KCl, containing lead, used in the reaction 4', contained 45.46 g. of Cl.

The mother liquors obtained are therefore sent directly to the reaction 3".

(3") Reaction of the mother-liquor from the first treatment with $PbSO_4$:

The A.M. 1, coming from the previous step, is diluted with water in the ratio 1:1 by weight and is then allowed to react again with $PbSO_4$ leaving them in contact with the latter at room temperature, for 3 hours. After this time the solid is separated from the liquid by filtration under vacuo. The solid obtained contains 1.78 g. of K in the form of lead syngenite. The mother-liquor obtained in this step (discharge A.M.) is discarded. It contains 0.67 g. of Pb, which is lost.

(4) Decomposition of the lead syngenite:

The lead syngenite obtained in the reactions 4', 3 and 3", and the $PbCl_2$ obtained in the reaction 3, are treated with water in the temperature range of 150–160° for 15 minutes. After this time the solution is separated from the solid by filtration.

This solution contains, in the form of KCl, all the K contained in the lead syngenite used, thus recovering the solution which was employed in the reaction 4', so that the cycle has to be considered as closed. The lead sulphate obtained is itself sent again into the cycle.

From the values given, it appears that the total yield of K in the whole cycle is as follows:

K obtained in the form of potassium sulphate $$179 \times 35.91 = 64.28 \text{ g.}$$

K introduced with the mineral $$630 \times 11.271 = 71.01 \text{ g.}$$

Yield of $$K = \frac{64.28}{71.01} \times 100 = 90.52\%$$

From these values it appears, too, that the loss of Pb, referred to the K obtained in form of potassium sulphate, is the following:

Pb eliminated in the discharge mother liquor: 0.67 g.
The corresponding amount of PbSO₄ will be:

$$0.67 \times 1.464 = 0.981 \text{ g.}$$

The loss of PbSO₄ will then be:

$$\frac{0.981}{64.28} \times 1.000 = 15.26 \text{ kg. every ton of K produced}$$

*Example 2*

(2') Washing of the crude schoenite:
698 g. of a schoenite of the following composition:

| | Percent by weight |
|---|---|
| K | 15.500 |
| Mg | 5.224 |
| Na | 3.063 |
| SO₄ | 38.818 |
| Cl | 5.355 |
| H₂O | 31.639 |
| Insoluble | 0.401 | are washed with 135 g. of cold water.

The washing liquors are then separated by filtration under vacuo.

568 g. of washed schoenite are thus obtained with the following composition in a wet condition:

| | Percent by weight |
|---|---|
| K | 17.320 |
| Mg | 5.705 |
| Na | 1.021 |
| SO₄ | 43.734 |
| Cl | 1.635 |
| H₂O | 30.123 |
| Insoluble | 0.462 |

The washing liquors are conveyed to the reaction 3'' in order to recover the potassium contained therein.

(4') Elimination of Pb from the solution of KCl:
1000 g. of a solution of KCl, containing lead, of the following composition:

| | Percent by weight |
|---|---|
| K | 5.490 |
| Pb | 0.512 |
| Cl | 5.156 |
| H₂O | 88.842 | are heated to 100° C.

To this hot solution 100 g. of washed schoenite are added. The schoenite dissolves completely, while lead syngenite is formed and is precipitated. The solution is warmed for 5 minutes and then filtered in order to separate it from the precipitate; the test for the lead with potassium chromate, on this solution, is negative.

The lead syngenite precipitated is sent to the decomposition reaction 4.

(1) Reaction of the solution of KCl with schoenite:
The hot solution, coming from the previous reaction, is treated with another 468 g. of washed schoenite. The solution is kept at a temperature of 100° C. for the time necessary for the complete dissolution of the added schoenite (about 5 minutes) and then cooled quickly at room temperature (25°).

In this way the potassium sulphate is precipitated and it is allowed to stay for two hours at room temperature; then the precipitate is separated by filtration under vacuo.

200 g. of potassium sulphate are obtained with the following composition in a wet condition:

| | Percent by weight |
|---|---|
| K | 36.319 |
| Mg | 0.855 |
| Na | 0.455 |
| SO₄ | 47.796 |
| Cl | 0.835 |
| H₂O | 12.913 |
| Insoluble | 0.827 |

The K₂O content of the dry product will therefore be:

$$K_2O = \frac{36.319}{87.087} \times 1.2046 \times 100 = 50.237\%$$

(2) Reaction of the A.M. schoenite with kainite:
The A.M. schoenite coming from the reaction 1, are treated at room temperature with 740 g. of crude kainite, by mechanical stirring for 3 hours and allowing them to stay for another two hours.

The kainite employed has the following composition:

| | Percent by weight |
|---|---|
| K | 10.829 |
| K₂O | 13.045 |
| Mg | 6.749 |
| Na | 11.394 |
| SO₄ | 27.516 |
| Cl | 26.758 |
| H₂O | 16.432 |
| Insoluble | 0.322 |

The schoenite precipitated is then separated from the mother-liquors by filtration under vacuo. 676 g. of schoenite are so obtained with the following composition in a wet condition:

| | Percent by weight |
|---|---|
| K | 16.023 |
| Mg | 5.595 |
| Na | 3.436 |
| SO₄ | 39.496 |
| Cl | 6.986 |
| H₂O | 28.039 |
| Insoluble | 0.425 |

This schoenite is sent to the washing process 2'.

(3) Reaction of the A.M. kainite with PbSO₄:
The A.M. kainite coming from the previous step is allowed to react with PbSO₄, keeping it in contact with the latter, at room temperature for 3 hours. After this time the solid is separated from the liquid by filtration under vacuo.

The solid obtained contains 40.16 g. of K in the form of lead syngenite (K₂SO₄.PbSO₄) and 51.30 g. of Cl in the form of PbCl₂.

From this value it appears that the PbCl₂ obtained in this reaction is enough, also in this case, to transform all the potassium separated in the cycle in the form of lead syngenite into KCl; in fact, the solution of KCl, containing lead, employed in the reaction 4' had a Cl content of 51.56 g. The mother-liquors yielded are therefore directly sent to the reaction 3''.

(3'') Reaction of A.M.₁ with PbSO₄:
The mother-liquors from the first treatment coming from the previous step, are mixed with the washing-liquor of the schoenite and diluted then with water in the ratio 1:1 by weight; they are then allowed to react again with PbSO₄, keeping them in contact with the latter at room temperature for 3 hours. After this time, the solid is separated from the liquid by filtration under vacuo. The solid obtained contains 13.32 g. of K in the form of lead syngenite.

The discharged mother-liquors obtained in this process are discarded. They contain 0.75 g. of Pb which is lost.

(4) Decomposition of the lead syngenite:

The lead syngenite, obtained in the reactions 4′, 3 and 3″ and the $PbCl_2$ obtained in the reaction 3, are treated with water at a temperature between 150° and 160° C. for 15 minutes. After this time the solution is separated from the solid by filtration.

This solution contains all the K that was in the lead syngenite used, in form of KCl; the solution which was employed in the reaction 4′ is thus recovered and the cycle can therefore be considered closed. The lead sulphate yielded is itself sent again into the cycle.

From the values shown it appears that the total yield in K of the whole cycle is the following:

K obtained in the form of lead sulphate $$200 \times 36.319 = 72.64 \text{ g.}$$

K introduced with the mineral $$740 \times 10.829 = 80.14 \text{ g.}$$

Yield in $$K = \frac{72.64}{80.14} \times 100 = 90.64\%$$

From these values it appears also that the loss in Pb, referred to the K obtained in the form of lead sulphate is the following:

Pb eliminated in the discharged mother-liquor: 0.75 g.
The corresponding amount of $PbSO_4$ will be:

$$0.75 \times 1.464 = 1.098 \text{ g.}$$

The loss of $PbSO_4$ will then be:

$$\frac{1.098}{72.64} \times 1000 = 15.12 \text{ kg. every ton of K produced}$$

What is claimed is:

1. In a process of producing substantially pure potassium sulfate from kainite, the steps which comprise converting the kainite into schoenite $K_2SO_4.MgSO_4.6H_2O$ by stirring said mineral at room temperature with a recycled mother liquor obtained on working up schoenite to potassium sulfate, separating by filtration the precipitated schoenite from the resulting mineral mother liquor, adding lead sulfate at room temperature to said mineral mother liquor to precipitate at least part of the potassium ions present therein in the form of lead syngenite $K_2SO_4.PbSO_4$ together with lead chloride, separating by filtration said lead syngenite and lead chloride from the mother liquor, diluting the resulting first lead syngenite mother liquor, adding lead sulfate at room temperature to said diluted lead syngenite mother liquor to precipitate the major part of the remaining potassium ions in the form of lead syngenite, separating by filtration said lead syngenite from the remaining second lead syngenite mother liquor to be discarded, combining said precipitated lead syngenite and lead chloride, the lead chloride content of said combined mixture of lead syngenite and lead chloride being adjusted to at least an amount of chloride ions equivalent to the amount of potassium ions present in said mixture of lead syngenite and lead chloride, treating said mixture of lead syngenite and lead chloride with water at a temperature of at least 100° C. to dissociate the lead syngenite to insoluble lead sulfate to be recycled and to convert the potassium sulfate and lead chloride into insoluble lead sulfate and a solution of potassium chloride, dissolving schoenite obtained from the kainite in said potassium chloride solution at about 100° C., the amount of schoenite being sufficient to completely precipitate lead ions present in said potassium chloride solution in the form of lead sulfate to be recycled, removing the precipitated lead sulfate from the hot solution, dissolving further amounts of schoenite in the resulting hot, lead-free filtrate at about 100° C., rapidly cooling the resulting lead-free schoenite solution to room temperature to cause crystallization of substantially pure potassium sulfate, separating by filtration said crystallized potassium sulfate from the mother liquor, and recycling said schoenite mother liquor to convert kainite.

2. The process according to claim 1, wherein the crude schoenite obtained by conversion of the potassium containing mineral is washed with cold water prior to its treatment with the potassium chloride solution, and wherein the schoenite wash waters are used for diluting the first lead syngenite mother liquor.

3. In a process of producing aqueous potassium chloride solutions from kainite, the steps which comprise converting the mineral into schoenite $K_2SO_4.MgSO_4.6H_2O$ by stirring said mineral at room temperature with a recycled mother liquor obtained on working up schoenite to potassium sulfate, separating by filtration the precipitated schoenite from the resulting mineral mother liquor, adding lead sulfate at room temperature to said mineral mother liquor to precipitate at least part of the potassium ions present therein in the form of lead syngenite $K_2SO_4.PbSO_4$ together with lead chloride, separating by filtration said lead syngenite and lead chloride from the mother liquor, diluting the resulting first lead syngenite mother liquor, adding lead sulfate at room temperature to said diluted lead syngenite mother liquor to precipitate the remaining potassium ions in the form of lead syngenite, separating by filtration said lead syngenite from the remaining second lead syngenite mother liquor to be discarded, combining said precipitated lead syngenite and lead chloride, the lead chloride content of said combined mixture of lead syngenite and lead chloride being adjusted to at least an amount of chloride ions equivalent to the amount of potassium ions present in said mixture of lead syngenite and lead chloride, treating said mixture of lead syngenite and lead chloride with water at elevated temperature to dissociate the lead syngenite to insoluble lead sulfate to be recycled and to convert the potassium sulfate formed thereby and lead chloride into insoluble lead sulfate and a solution of potassium chloride, and separating the insoluble lead sulfate from the solution of potassium chloride.

References Cited in the file of this patent

UNITED STATES PATENTS

| 30,521 | Mayer | Oct. 23, 1860 |
| 229,249 | Hake | June 29, 1880 |
| 2,684,285 | Dancy | July 20, 1954 |
| 2,862,788 | Stanley et al. | Dec. 2, 1958 |

OTHER REFERENCES

Dana: Textbook of Mineralogy, 4th Ed., 1932.

Annales de Chimie et de Physique (Cinquième Série), pp. 214–220, #14–1878.

Mellor: "Comprehensive Treatise on Inorganic and Theoretical Chemistry," Longsmans, Green and Co., N.Y., 1923, vol. 4, pages 339, 340 and 344; vol. 7, pages 809, 810, 812 and 820.